United States Patent
You

(10) Patent No.: US 12,273,781 B2
(45) Date of Patent: Apr. 8, 2025

(54) CELL HANDOVER METHOD, APPARATUS, NETWORK DEVICE, TERMINAL DEVICE AND STORAGE MEDIUM

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 548 days.

(21) Appl. No.: 17/468,448

(22) Filed: Sep. 7, 2021

(65) Prior Publication Data
US 2021/0410034 A1 Dec. 30, 2021

Related U.S. Application Data

(63) Continuation of application No. PCT/CN2019/078363, filed on Mar. 15, 2019.

(51) Int. Cl.
*H04W 36/08* (2009.01)
*H04W 36/00* (2009.01)
(Continued)

(52) U.S. Cl.
CPC ......... *H04W 36/08* (2013.01); *H04W 36/302* (2023.05); *H04W 36/362* (2023.05); *H04W 74/0833* (2013.01); *H04W 36/0064* (2023.05)

(58) Field of Classification Search
CPC ... H04W 36/00; H04W 36/30; H04W 36/362; H04W 72/23; H04W 74/0816; H04W 74/0866; H04B 1/713; H04L 5/00
See application file for complete search history.

(56) References Cited

U.S. PATENT DOCUMENTS

2011/0134882 A1* 6/2011 Aoyama ........... H04W 36/0066
370/331
2018/0206171 A1 7/2018 Basu Mallick et al.
(Continued)

FOREIGN PATENT DOCUMENTS

| CN | 107113673 A | 8/2017 |
|---|---|---|
| CN | 108632926 A | 10/2018 |

(Continued)

OTHER PUBLICATIONS

The First Office Action of corresponding Chinese application No. 202110519030.3 dated on Aug. 9, 2022 with machine translation by Global Dossier.
(Continued)

*Primary Examiner* — Iqbal Zaidi
(74) *Attorney, Agent, or Firm* — Ladas & Parry, LLP

(57) ABSTRACT

The present disclosure provides a cell handover method and apparatus, a network device, a terminal device and a storage medium. The cell handover method includes: a first network device sends a handover request to a second network device, where the handover request includes at least one of the following: conditional handover indication information, and duration suggestion information for a first timer; the first network device receives a handover command sent by the second network device, where the handover command includes configuration information used for handover and duration of the first timer, and the first timer is configured to control an effective time of the configuration information in the handover command; and the first network device sends the handover command and a condition set by the first network device for a terminal device to initiate handover to the second network device, to the terminal device.

17 Claims, 10 Drawing Sheets

(51) Int. Cl.
*H04W 36/30* (2009.01)
*H04W 36/36* (2009.01)
*H04W 74/0833* (2024.01)

(56) References Cited

U.S. PATENT DOCUMENTS

| | | | |
|---|---|---|---|
| 2018/0279193 A1 | 9/2018 | Park et al. | |
| 2019/0007879 A1* | 1/2019 | Baek | H04W 36/00835 |
| 2020/0187069 A1 | 6/2020 | Hong et al. | |
| 2022/0386192 A1* | 12/2022 | You | H04W 36/0079 |
| 2023/0118008 A1* | 4/2023 | Kim | H04W 74/0833 |
| | | | 370/329 |

FOREIGN PATENT DOCUMENTS

| | | |
|---|---|---|
| EP | 3562209 A1 | 10/2019 |
| KR | 20180118047 A1 | 10/2018 |
| WO | 2018113661 A1 | 6/2018 |
| WO | 2018156696 A1 | 6/2018 |
| WO | 2018230997 A1 | 12/2018 |
| WO | 2019047554 A1 | 3/2019 |
| WO | 2020186407 A1 | 9/2020 |

OTHER PUBLICATIONS

The Second Office Action of corresponding Chinese application No. 202110519030.3 dated on Oct. 17, 2022 with machine translation by Global Dossier.
International Search Report (ISR) dated Dec. 6, 2019 for Application No. PCT/CN2019/078363.
Written Opinion of the International Searching Authority, dated Dec. 6, 2019 for Application No. PCT/CN2019/076363, with machine translation provided by patentscope.
The first Office Action of corresponding European application No. 19919688.2, dated Oct. 28, 2022.
Intel Corporation, 3GPP TSG RAN Meeting #85 RP-192277; New WID: NR mobility enhancements, Newport Beach, USA, Sep. 16-20, 2019, entire document.
The EESR of corresponding European application No. 19919686.2, dated Jan. 25, 2022.
NEC:"Conditional handover procedure in LTE", 3GPP Draft: R2-1901003_LTE Cho, 3rd Generation Partnership Project (3GPP), Mobile Competence Centre; 650, Route Des Lucioles; F-06921 Sophia-Antipolis Cedex; France, Mar. 1, 2019(Mar. 1, 2019), pp. 1-4, XP051602369.

* cited by examiner

CELL HANDOVER METHOD, APPARATUS, NETWORK DEVICE, TERMINAL DEVICE AND STORAGE MEDIUM

CROSS-REFERENCE TO RELATED APPLICATIONS

This application is a continuation of International Application No. PCT/CN2019/078363, filed on Mar. 15, 2019, which is hereby incorporated by reference in its entirety.

TECHNICAL FILED

This application relates to but is not limited to the field of communications, and in particular refers to a cell handover method and apparatus, a network device, a terminal device, and a storage medium.

BACKGROUND

In a process of cell handover in wireless communications, a terminal device usually starts a handover timer (for example, T304 or T307) immediately after receiving a handover command from a target base station forwarded by a source base station and accesses the target cell. Correspondingly, after responding to the handover request of the source base station, the target base station also configures and manages resources allocated to the terminal device for accessing the target cell according to an immediate handover procedure. However, when the above-mentioned immediate handover procedure is adopted for conditional handover (CHO, Conditional Handover), it is likely that the terminal device cannot initiate the handover to the target cell, and therefore is not suitable for conditional handover.

SUMMARY

The following is an overview of subject matter detailed herein. This summary is not intended to limit the scope of protection of the claims.

In a first aspect, embodiments of the present disclosure provide a cell handover method, including:

sending, by a first network device, a handover request to a second network device, where the handover request includes at least one of the following: conditional handover indication information and duration suggestion information for a first timer;

receiving, by the first network device, a handover command sent by the second network device, where the handover command includes configuration information used for handover and duration of the first timer, and the first timer is configured to control an effective time of the configuration information in the handover command;

sending, by the first network device, to a terminal device, the handover command and a condition set by the first network device for the terminal device to initiate handover to the second network device.

In a second aspect, the embodiments of the present disclosure provide a cell handover method, including:

receiving, by a second network device, a handover request sent by a first network device, where the handover request includes at least one of the following: conditional handover indication information, and duration suggestion information for a first timer;

configuring, by the second network device, duration of the first timer according to at least one of the conditional handover indication information and the duration suggestion information for the first timer;

sending, by the second network device, a handover command to the first network device, where the handover command includes configuration information used for handover and the duration of the first timer, and the first timer is configured to control an effective time of the configuration information in the handover command.

In a third aspect, the embodiments of the present disclosure provide a cell handover method, including:

receiving, by a terminal device, a handover command and a condition set by a first network device for the terminal device to initiate handover to a second network device that are sent by the first network device, where the handover command includes configuration information used for handover and duration of a first timer, and where the first timer is configured to control an effective time of the configuration information in the handover command;

starting, by the terminal device, the first timer when receiving the handover command;

when the first timer does not expire and the condition for the terminal device to initiate handover to a second network device is met, initiating, by the terminal device a procedure of accessing a cell of the second network device.

In a fourth aspect, the embodiments of the present disclosure provide a network device, including:

a sending unit, configured to send a handover request to a second network device, where the handover request includes at least one of the following: conditional handover indication information and duration suggestion information for a first timer;

a receiving unit, configured to receive a handover command sent by the second network device, where the handover command includes configuration information used for handover and duration of the first timer, and the first timer is configured to control an effective time of the configuration information in the handover command;

where the sending unit is further configured to send, to a terminal device, the handover command and a condition set by the network device for the terminal device to initiate handover to the second network device.

In a fifth aspect, the embodiments of the present disclosure provide a network device, including:

a receiving unit, configured to receive a handover request sent by a first network device, where the handover request includes at least one of the following: conditional handover indication information and duration suggestion information for a first timer;

a processing unit, configured to configure duration of the first timer according to at least one of the conditional handover indication information and the duration suggestion information for the first timer;

a sending unit, configured to send a handover command to the first network device, where the handover command includes configuration information used for handover and the duration of the first timer, and the first timer is configured to control an effective time of the configuration information in the handover command.

In a sixth aspect, the embodiments of the present disclosure provide a terminal device, including:

a receiving unit, configured to receive a handover command and a condition set by a first network device for the terminal device to initiate handover to a second network device that are sent by the first network device, where the handover command includes configuration information used for handover and duration of a first timer, and where the first timer is configured to control an effective time of the configuration information in the handover command;

a processing unit, configured to start the first timer when the handover command is received, and when the first timer does not expire and the condition for the terminal device to initiate handover to a second network device is met, initiate a procedure of accessing a cell of the second network device.

In a seventh aspect, the embodiments of the present disclosure provide a network device, including a memory, a processor, and a computer program stored on the memory and executable on the processor, and when the processor executes the computer program, the cell handover method described according to the first aspect is implemented.

In an eighth aspect, the embodiments of the present disclosure provide a network device, including a memory, a processor, and a computer program stored on the memory and executable on the processor, and when the processor executes the computer program, the cell handover method according to the second aspect is implemented.

In a ninth aspect, the embodiments of the present disclosure provide a terminal device, including a memory, a processor, and a computer program stored on the memory and executable on the processor, and when the processor executes the computer program, the cell handover method according to the third aspect is implemented.

In a tenth aspect, the embodiments of the present disclosure provide a computer-readable storage medium having a computer program stored thereon, and when the computer program is executed by a processor, the cell handover method according to the first aspect is implemented.

In an eleventh aspect, the embodiments of the present disclosure provide a computer-readable storage medium having a computer program stored thereon, and when the computer program is executed by a processor, the cell handover method according to the second aspect is implemented.

In a twelfth aspect, the embodiments of the present disclosure provide a computer-readable storage medium having a computer program stored thereon, and when the computer program is executed by a processor, the cell handover method according to the third aspect is implemented.

After reading and understanding the drawings and detailed description, other aspects can be understood.

DESCRIPTION OF EMBODIMENTS

The technical solutions in the embodiments of the present disclosure will be described below in conjunction with the drawings in the embodiments of the present disclosure. Obviously, the described embodiments are part of embodiments of the present disclosure, rather than all of the embodiments. Based on the embodiments in the present disclosure, all other embodiments obtained by those of ordinary skill in the art without creative efforts should fall within the protection scope of the present disclosure.

Figure 1:
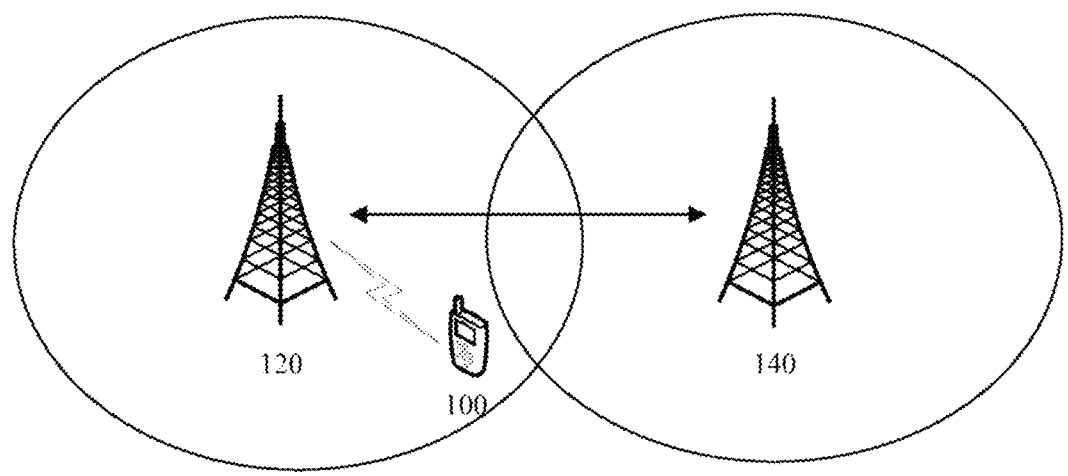
FIG. 1 is a schematic diagram of an application scenario of an illustrative embodiment of the present disclosure.

FIG. 1 is a schematic diagram of an application scenario of an illustrative embodiment of the present disclosure. As shown in FIG. 1, a communication system may include a terminal 100 and at least two network devices 120 and 140. The terminal device 100 can communicate with a network device through an air interface. For example, when the terminal device 100 is located in a cell of the network device 120, it may exchange information with the network device 120. When the terminal device 100 moves from the cell of the network device 120 to a cell of the network device 140, handover will occur, and then the terminal device 100 may exchange information with the network device 140. Network devices, for example, network devices 120 and 140, may communicate with each other.

It should be understood that the communication system shown in FIG. 1 is only an example, and the embodiments of the present disclosure are not limited thereto. The technical solutions of the embodiments of the present disclosure can be applied to various communication systems, for example, a long term evolution (LTE) system, an LTE time division duplex (TDD), a universal mobile telecommunication system (UMTS), a 5G new radio (NR) communication system, etc.

The network devices 120 and 140 may be evolved base stations (Evolutional Node B, eNB or eNodeB) in LTE, base station devices in a 5G network, or base stations in a future communication system.

The terminal 100 may communicate with one or more core networks (Core Network) via a radio access network (Radio Access Network, RAN), and may also be referred to as an access terminal, a user equipment (UE), a user unit, a user station, a mobile station, a mobile platform, a remote station, remote terminal, a mobile device, a user terminal, a terminal, a wireless communication device, a user agent, or a user device. For example, the terminal 100 may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with wireless communication capabilities, a computing device or other processing devices connected to a wireless modem, a vehicle-mounted device, a wearable device, or a terminal device in a 5G network, etc.

Figure 2:
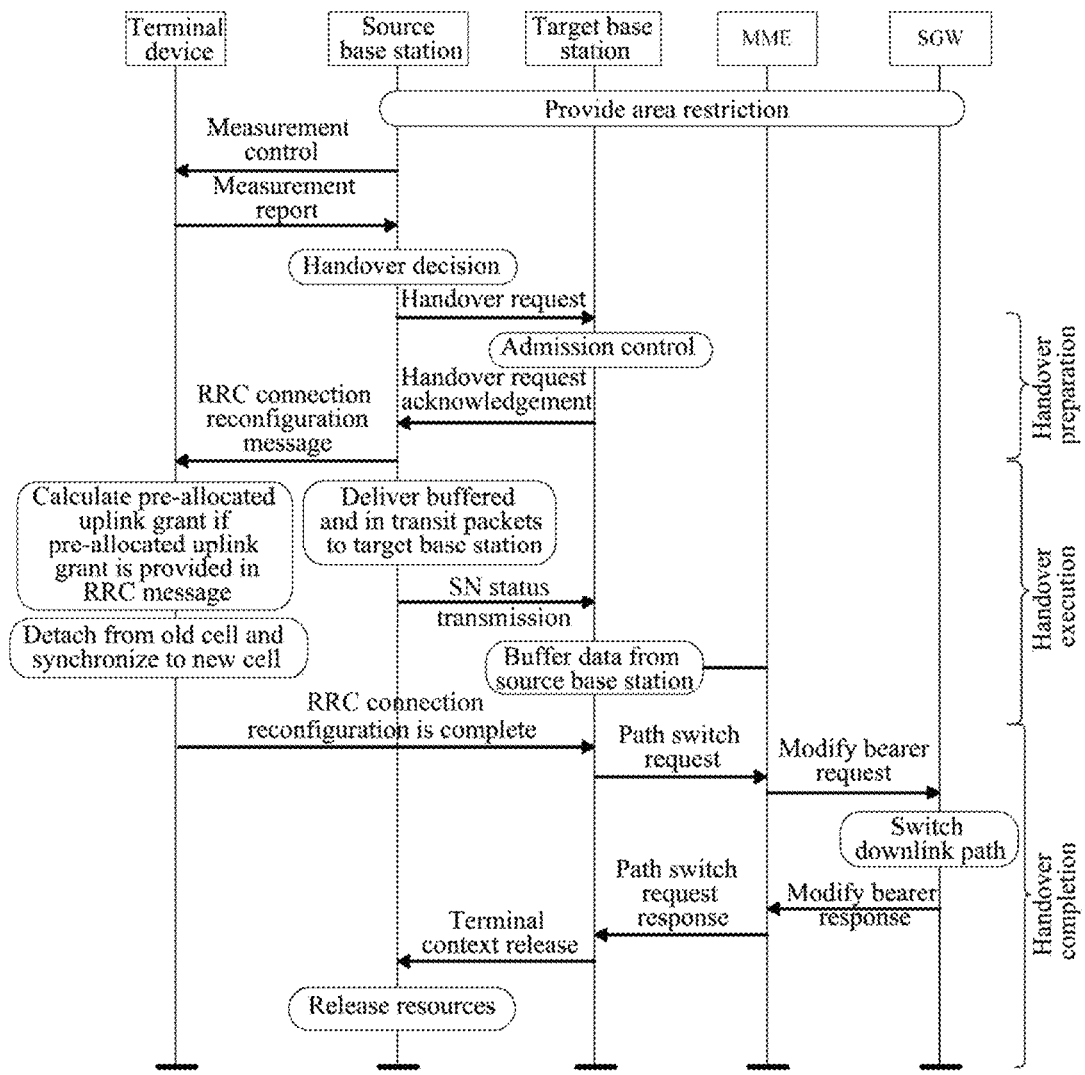
FIG. 2 is a schematic diagram of a cell handover procedure.

FIG. 2 is a schematic diagram of a cell handover procedure. As shown in FIG. 2, a main procedure of cell handover (Handover) may include three phases: a handover preparation phase, a handover execution phase, and a handover completion phase. A source base station is a base station of a cell where the terminal device is currently located, and a target base station is a base station of a target cell to which the terminal device is handed over.

As shown in FIG. 2, in the handover preparation phase, the source base station may configure the terminal device to perform measurement reporting, and send a handover request to the target base station based on a measurement report reported by the terminal device. After the target base station agrees to the handover request, the target base station configures a handover command for the terminal equipment, which includes a dedicated random access channel (RACH, Random Access Channel) resource, a cell radio network temporary identifier (C-RNTI, Cell Radio Network Temporary Identifier), a security algorithm of the target base station and a system message of the target base station (the system message includes common RACH resources), etc. The dedicated RACH resource may include a dedicated preamble for contention-free random access, and a common RACH resource is a RACH resource for contention-based random access.

As shown in FIG. 2, in the handover execution phase, the source base station can forward the handover command to the terminal device through a radio resource control (Radio Resource Control, RRC) message (such as an RRC connection reconfiguration message or an RRC reconfiguration message). After receiving the handover command, the terminal device may initiate a random access procedure to the target base station. At the same time, the source base station sends sequence number (SN, Sequence Number) status (Status) to the target base station to inform the target base station of uplink Packet Data Convergence Protocol (PDCP, Packet Data Convergence Protocol) SN reception status and downlink PDCP SN transmission status.

As shown in FIG. 2, in the handover completion stage, when the terminal device successfully accesses the target base station (random access is successful), the target base station sends a path switch request (Path Switch Request) to a mobility management entity (MME, Mobility Management Entity), requests the MME to switch the downlink path. The MME sends a modify bearer request (Modify Bearer Request) to a serving gateway (Serving Gateway, SGW) for switching the downlink path.

A timer can be used during the handover procedure. Examples of timers that can be used during handover are shown in Table 1 below.

TABLE 1

Examples of timers that can be used during handover

| Timer | Start | Stop | At expiry |
|---|---|---|---|
| T312 | Sending a measurement report and T310 is running | Receiving N311 consecutive in-sync indications from lower layers; Receiving a handover command Trigger a connection re-establishment | Return to an idle state; or Perform connection re-establishment |

TABLE 1-continued

Examples of timers that can be used during handover

| Timer | Start | Stop | At expiry |
|---|---|---|---|
| | | procedure; or Expiry of T310 | |
| T310 | Receiving N310 consecutive out-of-sync indications from physical layer | Receiving N311 consecutive in-sync indications from physical layer; Receiving a handover command; or Triggering a connection re-establishment procedure | Perform RRC connection re-establishment; or Return to an idle state |
| T304 | Receiving a handover command | Successful completion of handover (successful random access) | Initiate RRC connection re-establishment |
| T307 | Receiving a handover command | Successful completion of random access on primary and secondary cells (Primary and Secondary Cells, PSCell) | Inform the Evolved UMTS Terrestrial Radio Access Network (Evolved UMTS Terrestrial Radio Access Network, E-UTRAN) about secondary cell group (Secondary Cell Group, SCG) failure |

The duration of timers T312 and T310 can be configured by the source base station, and the duration of timers T304 and T307 can be configured by the target base station.

The timer T312 starts when a measurement report is sent. If the timer expires, the terminal device returns to the idle state (IDLE) or initiates a connection re-establishment procedure. The premise of the existence of the timer T312 is that the timer T310 is running, and when the terminal device receives multiple out-of-sync indications reported by the physical layer, the timer T310 starts. However, due to the long duration of timer T310, the problem of handover too late (for example, the handover command has not been received) can hardly be avoided, so the timer T312 is introduced to avoid the situation of handover too late. When the UE receives a handover command, both timers T310 and T312 will stop.

The timers T304 and T307 both start when the terminal device receives a handover command, and are configured to control an effective time of a configured RACH resource and limit the time for the terminal device to access the target base station or secondary node (Secondary Node, SN).

For some special scenarios, for example, in a condition where the terminal device moves in a high speed or high frequency bands (for example, frequency bands above 6 GHz) are deployed, the terminal device needs to frequently perform cell handover. The terminal device can be configured with a handover command in advance through conditional handover (Conditional handover). For example, in a high-speed rail scenario, the running track of the terminal device is specific. Therefore, the source base station can configure the target base station for the terminal device in advance, and send the terminal device a condition for triggering the terminal device to perform handover. The handover condition may be sent to the terminal device when the source base station forwards the handover command through an RRC message. When the handover condition is met, the terminal device may initiate an access request to the target base station.

The condition for triggering the terminal device to perform handover may be set based on a received signal of the terminal device and/or a geographic location of the terminal device. For example, the handover condition may be set based on one or more of the following: signal strength of the target cell (for example, reference signal received power (Reference Signal Received Power, RSRP) of the target cell), signal quality of the target cell (for example, reference signal received quality (Reference Signal Received Quality, RSRP) of the target cell), a signal noise ratio (Signal Noise Ratio, SNR) of the target cell, comparison between a signal of the target cell and a signal of the source cell, an absolute geographic location of the terminal device, and a distance between the terminal device and the source base station. For example, the condition for triggering the terminal device to perform handover may include: the signal strength of the target cell is greater than a certain threshold, or may include: the signal strength of the target cell is higher than the signal strength of the cell where the terminal is currently located by a certain offset, or may include: the distance of the terminal device to a boundary area of a source cell or to the source base station is greater than a certain threshold, which is not limited in the present disclosure. It should be understood that the target cell refers to a cell of the target base station, and the source cell refers to a cell of the source base station.

In the existing conventional handover procedure, after receiving the handover command of the target base station forwarded by the source base station, the terminal device immediately starts a handover timer (for example, timer T304 or T307) and initiates an access procedure to the target cell. After the target base station responds to the handover request of the source base station, it also configures and manages resources allocated to the terminal device for accessing a target cell in accordance with an immediate handover procedure. However, for conditional handover, the terminal device does not perform handover immediately after receiving the handover command, but only performs handover when the handover condition is met. In this case, if the target base station still configures and manages the resources allocated to the terminal device for accessing the target cell and sets the duration of the handover timer according to the immediate handover procedure, then when the handover condition is triggered, the handover timer is likely to expire, causing the terminal device to be unable to initiate handover to the target cell.

Illustrative embodiments of the present disclosure provide a cell handover method, where a target base station can reasonably maintain resources allocated to a terminal device for conditional handover through handover request and handover command configuration and handover execution mode used for conditional handover, and thereby the terminal device can access a target cell with effective resources when performing conditional handover.

Figure 3:
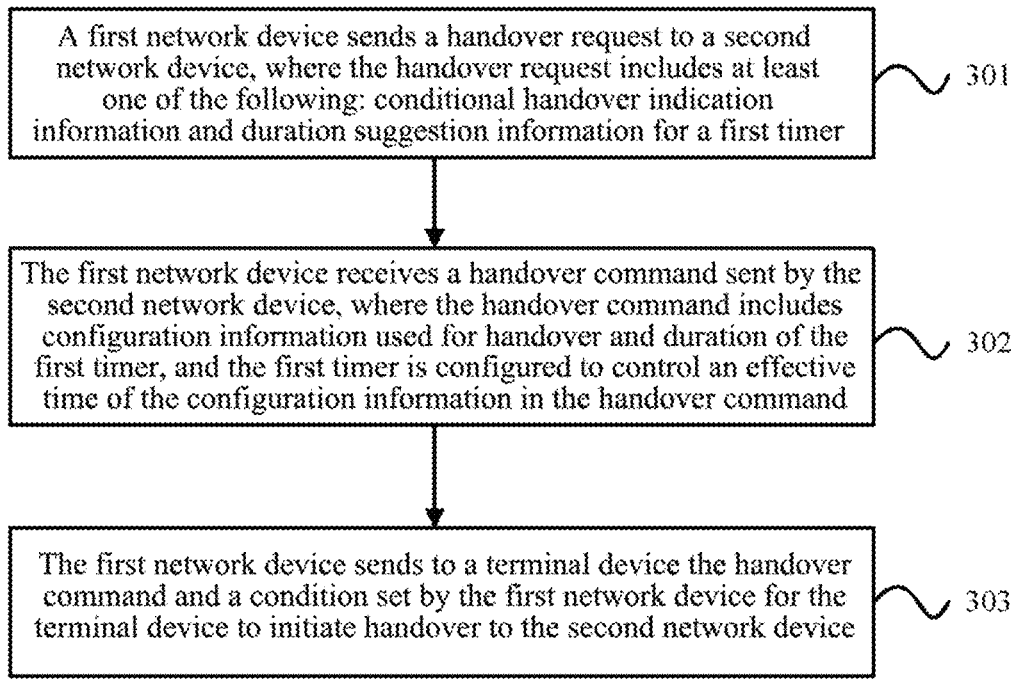
FIG. 3 is a flowchart of a cell handover method according to an illustrative embodiment of the present disclosure.

An illustrative embodiment of the present disclosure provides a cell handover method. As shown in FIG. 3, the method may include operations 301-303.

In 301, a first network device sends a handover request to a second network device, where the handover request includes at least one of the following: conditional handover indication information, and duration suggestion information for a first timer.

In an illustrative embodiment, the first network device may be a source base station in cell handover, and the second network device may be a target base station in cell handover.

In an illustrative embodiment, the conditional handover indication information may be configured to indicate that the handover request is for conditional handover. The suggested duration information for the first timer may include at least one of the following: suggested duration of the first timer, and estimated duration required for the terminal device to reach a cell of the second network device. The conditional handover indication information and/or the duration suggestion information for the first timer are configured for the second network device to set a reasonable duration of the first timer for the conditional handover. For example, according to the conditional handover indication information and/or the duration suggestion information for the first timer from the first network device, the second network device may configure a relatively long duration of the first timer, so that when the terminal device needs to initiate handover to a cell of the second network device when the handover condition is met, the first timer is likely to have not expired, thereby increasing a success rate of the terminal device initiating handover. The first timer may be the handover timer T304 or T307.

In an illustrative embodiment, the first network device may determine the suggested duration information for the first timer according to at least one of the following: moving speed of the terminal device, moving direction of the terminal device, and signal quality of the serving cell currently reported by the terminal device. For example, the first network device can determine the movement of the terminal device according to the moving speed, the moving direction, and/or the currently reported signal quality of the serving cell of the terminal device, so as to generate the suggested duration of the first timer and/or estimate the duration required for the terminal device to reach the cell of the second network device, and send the same to the second network device as the duration suggestion information for the first timer.

In an illustrative embodiment, the method may further include: the first network device sends updated duration suggestion information for the first timer to the second network device. For example, after the first network device sends the duration suggestion information for the first timer to the second network device through the handover request, the first network device may send the updated duration suggestion information for the first timer to the second network device at regular intervals or irregularly according to a moving position of the terminal device, so as to avoid that the second network device reserves handover a resource for the terminal device for a too long time. The first network device may send the updated duration suggestion information for the first timer through a handover request or other messages.

Figure 8:
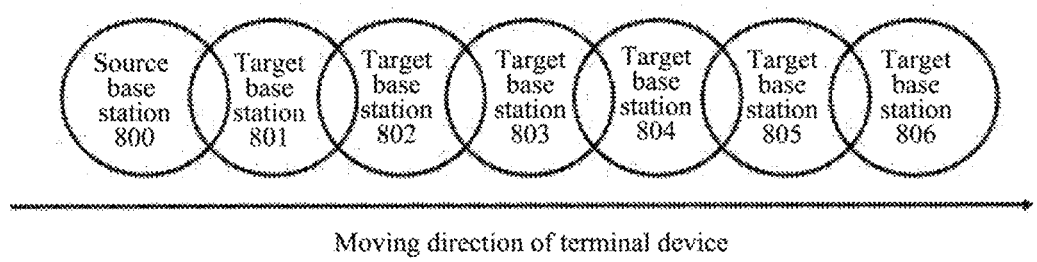
FIG. 8 is a schematic diagram of an illustrative application scenario of the present disclosure.
Figure 9:
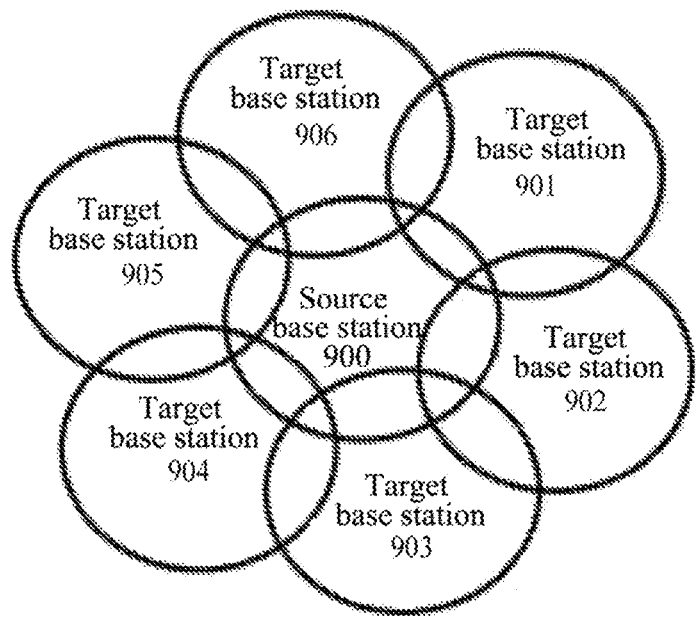
FIG. 9 is a schematic diagram of another illustrative application scenario of the present disclosure.

In an illustrative embodiment, the first network device sending the handover request to the second network device may include: the first network device sends the handover request to at least one second network device in the moving direction of the terminal device; or the first network device sends the handover request to at least one second network device around the first network device. Illustrative scenarios are shown in FIG. 8 and FIG. 9.

In 302, the first network device receives a handover command sent by the second network device, where the handover command includes configuration information used for handover and duration of the first timer, and the first timer is configured to control an effective time of the configuration information in the handover command.

In an illustrative embodiment, the configuration information used for handover in the handover command may include at least one of the following: a dedicated RACH resource, a C-RNTI, a security algorithm of the second network device, and a system message of the second network device, where the dedicated RACH resource may include a dedicated preamble used for contention-free random access, the system message may include a common RACH resource, and the common RACH resource is a RACH resource used for contention-based random access. The first timer is configured to control the effective time of the configuration information in the handover command. For example, when the first timer expires, the configuration information in the handover command becomes invalid, and the terminal device cannot initiate handover to the second network device according to the configuration information.

In an illustrative embodiment, the handover command may further include: duration of a second timer configured for part of resources to be used to access a cell of the second network device. The second timer is configured to control an effective time of the part of resources to be used to access the cell of the second network device. The part of resources to be used to access the cell of the second network device may include: a dedicated RACH resource. The dedicated RACH resource may include a dedicated preamble. For example, the second network device may set a separate timer for part of configuration information in the handover command; for example, configure a separate second timer for the dedicated preamble in the dedicated RACH resource. The duration of the second timer may be shorter than the duration of the first timer, so as to avoid reserving the dedicated RACH resource for a long time. The introduction of a second timer for the dedicated RACH resource will help the second network device to manage dedicated RACH resources and can optimize the use of dedicated RACH resources in the cell. For example, when the second timer expires, the corresponding dedicated RACH resource can be re-allocated to other terminal devices in the cell. However, this disclosure does not have a limitation on this.

In 303, the first network device sends, to a terminal device, the handover command and a condition set by the first network device for the terminal device to initiate handover to the second network device.

In an illustrative embodiment, the first network device may send the handover command to the terminal device through an RRC message (for example, an RRC connection reconfiguration message or an RRC reconfiguration message), and the RRC message may further include the condition set by the first network device for the terminal device to initiate handover to the second network device. The first network device may set a condition for the terminal device to initiate handover to the second network device based on the received signal of the terminal device and/or the geographic location of the terminal device. For example, the handover condition may be set based on one or more of the following: signal strength of a cell of the second network device (for example, RSRP of a cell of the second network device), signal quality of a cell of the second network device (for example, RSRQ of a cell of the second network device), a signal-to-noise ratio (SNR) of a cell of the second network device, and comparison of the signal of a cell of the second network device cell with the signal of a cell of the first network device, the absolute geographic location of the terminal device, and the distance between the terminal device and the first network device. For example, the condition set by the first network device for the terminal device to initiate handover to the second network device may include: the signal strength of the second network device cell is greater than a certain threshold, or may include: the signal strength of the second network device cell is higher than the signal strength of the first network device cell by a certain offset, or may include: the distance that the terminal device reaches a boundary area of a cell of the first network device or the distance to the first network device is greater than a certain threshold. This disclosure does not have a specific limitation on this.

Figure 4:
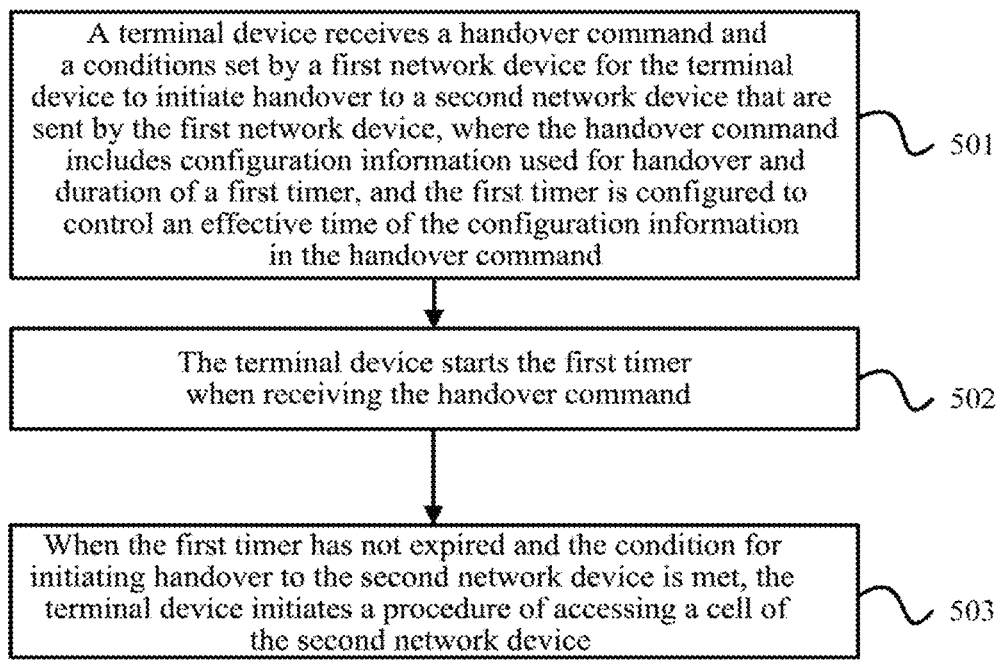
FIG. 4 is a flowchart of a cell handover method according to another illustrative embodiment of the present disclosure.

An illustrative embodiment of the present disclosure provides a cell handover method. As shown in FIG. 4, the method may include operations 401-403.

In 401, a second network device receives a handover request sent by a first network device, where the handover request includes at least one of the following: conditional handover indication information, and duration suggestion information for a first timer.

In an illustrative embodiment, the first network device may be a source base station in cell handover, and the second network device may be a target base station in cell handover.

In an illustrative embodiment, the conditional handover indication information may be configured to indicate that the handover request is for conditional handover. The suggested duration information for the first timer may include at least one of the following: suggested duration of the first timer, and estimated duration required for the terminal device to reach a cell of the second network device.

In an illustrative embodiment, the method may further include: the second network device receives updated duration suggestion information for the first timer sent by the first network device. For example, the second network device periodically or aperiodically receives the updated duration suggestion information for the first timer sent by the first network device. The updated duration suggestion information for the first timer may be carried in a handover request or other messages.

In 402, the second network device configures duration of the first timer according to at least one of the conditional handover indication information and the duration suggestion information for the first timer.

In an illustrative embodiment, the second network device configuring the duration of the first timer according to at least one of the conditional handover indication information and the duration suggestion information for the first timer, may include: when the handover request includes the conditional handover indication information, the second network device determines according to the conditional handover indication information that the handover request is for conditional handover, and configures the duration of the first timer for conditional handover; when the handover request includes the duration suggestion information for the first timer, the second network device configures the duration of the first timer according to the duration suggestion information for the first timer; when the handover request includes the conditional handover indication information and the duration suggestion information for the first timer, the second network device determines according to the conditional handover indication information that the handover request is for conditional handover, and configures the duration of the first timer according to the duration suggestion information for the first timer. Specifically, when the second network device configures the duration of the first timer, duration suggested by the first network device may be directly adopted, or the duration of the first timer may be independently configured based on the duration suggested by the first network device. This disclosure does not have a limitation on this.

For example, the second network device may configure a reasonable duration of the first timer suitable for conditional handover based on the conditional handover indication information and/or the duration suggestion information for the first timer from the first network device. For example, the second network device can set a relatively long duration of the first timer, so that when the terminal device needs to initiate handover to a cell of the second network device when the handover condition is met, the first timer is likely to have not expired, thereby increasing the success rate of the terminal device initiating handover. The first timer may be the handover timer T304 or T307.

In 403, the second network device sends a handover command to the first network device, where the handover command includes configuration information used for handover and the duration of the first timer, and the first timer is configured for controlling an effective time of the configuration information in the handover command.

In an illustrative embodiment, the configuration information used for handover in the handover command may include at least one of the following: a dedicated RACH resource, a C-RNTI, a security algorithm of the second network device, and a system message of the second network device, where the dedicated RACH resource may include a dedicated preamble used for contention-free random access, the system message may include a common RACH resource, and a common RACH resource is a RACH resource used for contention-based random access. The first timer is configured to control the effective time of the configuration information in the handover command. For example, when the first timer expires, the configuration information in the handover command becomes invalid, and the terminal device cannot initiate handover to the second network device according to the configuration information.

In an illustrative embodiment, the method may further include: the second network device configures a second timer for part of resources to be used to access a cell of the second network device; the handover command sent by the second network device to the first network device further includes duration of the second timer. The second network device configuring the second timer for part of resources to be used for accessing a cell of the second network device, may include: the second network device configures a second timer for a dedicated RACH resource. The second network device configuring a second timer for the dedicated RACH resource, may include: the second network device configures a second timer for a dedicated preamble.

For example, the second network device may set a separate timer for part of configuration information in the handover command, for example, configure a separate second timer for the dedicated preamble in the dedicated RACH resource. The duration of the second timer may be shorter than the duration of the first timer, so as to avoid reserving the dedicated RACH resource for a long time. The introduction of the second timer for the dedicated RACH resource will help the second network device to manage dedicated RACH resources and can optimize the use of dedicated RACH resources in the cell. For example, when the second timer expires, the corresponding dedicated RACH resource can be re-allocated to other terminal devices in the cell. However, this disclosure does not have a limitation on this.

Figure 5:
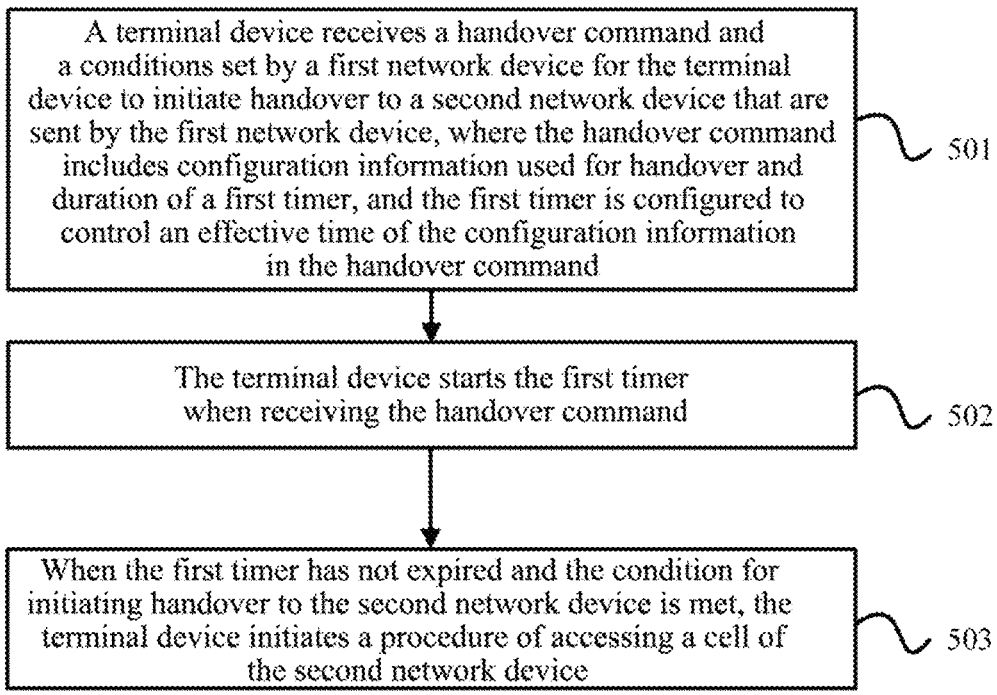
FIG. 5 is a flowchart of a cell handover method according to still another illustrative embodiment of the present disclosure.

An illustrative embodiment of the present disclosure provides a cell handover method. As shown in FIG. 5, the method may include operations 501-503.

In 501, a terminal device receives a handover command and a condition set by a first network device for the terminal device to initiate handover to a second network device that are sent by the first network device, where the handover command includes configuration information used for handover and duration of a first timer, and the first timer is configured to control an effective time of the configuration information in the handover command.

In an illustrative embodiment, the first network device may be a source base station in cell handover, and the second network device may be a target base station in cell handover.

In an illustrative embodiment, the configuration information used for handover in the handover command may include at least one of the following: a dedicated RACH resource, a C-RNTI, a security algorithm of the second network device, a system message of the second network device, where the dedicated RACH resource may include a dedicated preamble used for contention-free random access, the system message may include a common RACH resource, and the common RACH resource is a RACH resource used for contention-based random access. The first timer is configured to control the effective time of the configuration information in the handover command. For example, when the first timer expires, the configuration information in the handover command becomes invalid, and the terminal device cannot initiate handover to the second network device according to the configuration information.

In an illustrative embodiment, the terminal device may receive an RRC message (for example, an RRC connection reconfiguration message or an RRC reconfiguration message) from the first network device, where the RRC message includes the handover command, and the RRC message can further include the condition set by the first network device for the terminal device to initiate handover to the second network device.

In 502, the terminal device starts the first timer when receiving the handover command.

In 503, when the first timer has not expired and the condition for the terminal device to initiate handover to a second network device is met, the terminal device initiates a procedure of accessing a cell of the second network device.

In an illustrative embodiment, the handover command may further include: duration of a second timer configured for part of resources to be used to access a cell of the second network device; the method may further include: the terminal device starts the second timer when receiving the handover command. The second timer is configured to control an effective time of the part of resources to be used to access the cell of the second network device. The part of resources to be used to access the cell of the second network device may include: a dedicated random access channel RACH resource. The dedicated RACH resource may include a dedicated preamble.

In an illustrative embodiment, when the first timer does not expire and the condition for the terminal device to initiate handover to a second network device is met, the terminal device initiating the procedure of accessing the cell of the second network device, may include: when the first timer has not expired and the condition for the terminal device to initiate handover to a second network device is met, and the second timer has not expired, the terminal device uses the dedicated RACH resource to initiate random access to the cell of the second network device; when the first timer has not expired and the condition for initiating a handover to the second network device is met, and the second timer has expired, the terminal device uses a common RACH resource to initiate random access to the cell of the second network device.

In an illustrative embodiment, the method may further include: when the first timer has not expired, the terminal device re-attempts to access the cell of the second network device, and when the second timer has expired, the terminal device uses the common RACH resource to initiate random access to the cell. For example, when the terminal device fails to re-attempt to access the cell of the second network device, if the first timer has not expired, the terminal device will re-attempt to access the cell of the second network device. If the second timer has expired at this time, the terminal device can use the common RACH resource to initiate random access to the cell.

In an illustrative embodiment, the method may further include: when the first timer has not expired and there are multiple cells of the second network device that meet the condition for initiating handover, the terminal device selects to initiate an access procedure to a cell of the second network device of which the second timer has not expired.

In an illustrative embodiment, the method may further include: when the first timer has not expired and there are multiple cells of the second network device that meet the condition for initiating handover, and the second timer of a cell of the second network device has expired when the terminal device re-attempts to access the cell of the second network device, then the terminal device selects to initiate an access procedure to another cell of the second network device of which the second timer has not expired.

The cell handover method provided by the illustrative embodiment of the present disclosure enables the target base station to reasonably maintain resources allocated to the terminal device for conditional handover through the handover request and handover command configuration used for conditional handover and the handover execution mode, so that the terminal device can access the target cell with effective resources when performing conditional handover.

Figure 6:
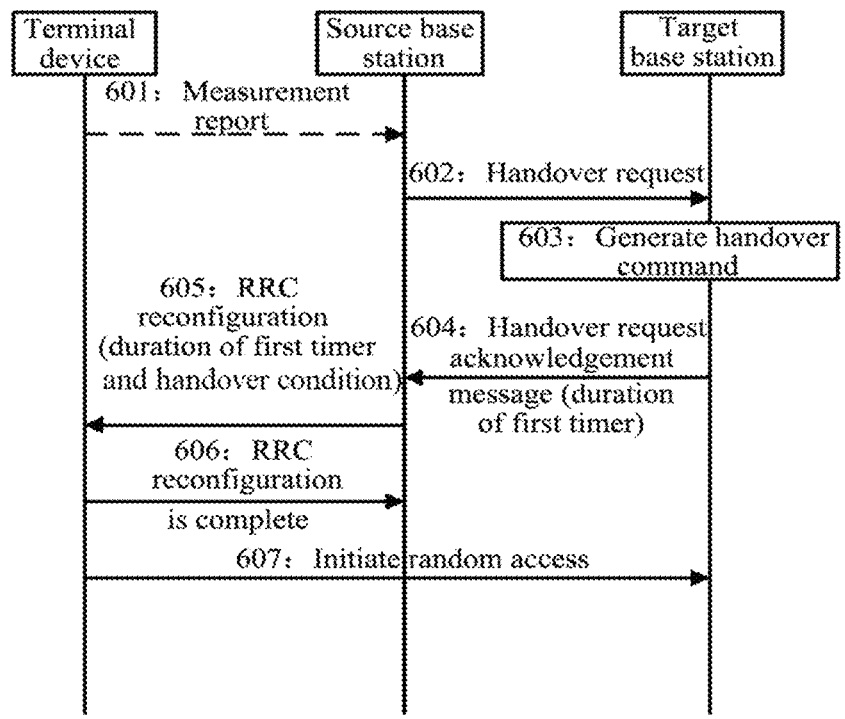
FIG. 6 is a flowchart of a cell handover method in an example of the present disclosure.

An example of the cell handover method provided by the present disclosure is as shown in FIG. 6. The cell handover procedure in this example may include operations 601-607. The source base station and the target base station in this example respectively correspond to the aforementioned first network device and second network device.

In 601, the source base station receives a measurement report reported by the terminal device. In this example, the source base station may initiate a handover procedure based on the measurement report reported by the terminal, however, this disclosure does not have a limitation on this. In other implementations, the source base station may not initiate the handover procedure based on the measurement report. For example, the source base station may initiate a handover procedure to handover the terminal device to the target cell when load of the cell of the source base station exceeds a certain threshold, or, the source base station may pre-select a target cell according to the movement track of the terminal to initiate a handover procedure.

In 602, the source base station sends a handover request to the target base station. The handover request may include at least one of conditional handover indication information and duration suggestion information for a first timer.

In 603, after receiving the handover request, the target base station generates a handover command. The target base station may configure duration of the first timer according to at least one of the conditional handover indication information and the duration suggestion information for the first timer in the handover request.

In 604, the target base station sends a handover command to the source base station through a handover request acknowledgement message.

In 605, the source base station sends the handover command of the target base station and a condition set by the source base station for the terminal device to initiate handover to the target base station, to the terminal device through an RRC reconfiguration message, where the handover command includes the duration of the first timer.

In 606, the terminal device sends an RRC reconfiguration complete message to the source base station.

In 607, when the first timer has not expired and the condition for initiating handover to the target base station is met, the terminal device initiates random access to the target cell.

Figure 7:
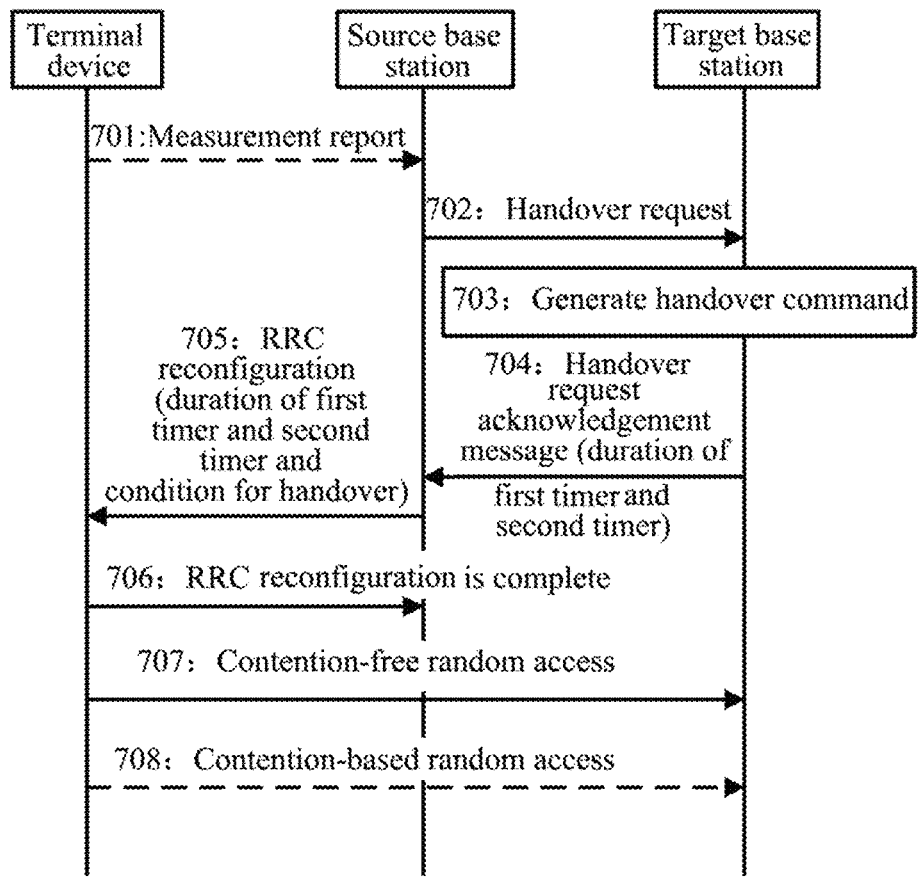
FIG. 7 is a flowchart of a cell handover method in another example of the present disclosure.

Another example of the cell handover method provided by the present disclosure is as shown in FIG. 7. The cell handover procedure in this example may include operations 701-708. The source base station and the target base station in this example respectively correspond to the aforementioned first network device and second network device.

In 701, the source base station receives a measurement report reported by the terminal device. In this example, the source base station may initiate a handover procedure based on the measurement report reported by the terminal; however, this disclosure does not have a limitation on this. In other implementations, the source base station may not initiate the handover procedure based on the measurement report. For example, the source base station may initiate the handover procedure to handover the terminal device to the target cell when load of the cell of the source base station exceeds a certain threshold, or, the source base station can pre-select a target cell according to the movement track of the terminal to initiate the handover procedure.

In 702, the source base station sends a handover request to the target base station. The handover request may include at least one of conditional handover indication information and duration suggestion information for the first timer.

In 703, after receiving the handover request, the target base station generates a handover command. The target base station may configure duration of the first timer according to at least one of the conditional handover indication information and the duration suggestion information for the first timer in the handover request. Further, the target base station may also configure a second timer for part of resources to be used to access a target cell. For example, the target base station may configure a second timer for a dedicated RACH resource (for example, a dedicated preamble) to be used to access the target cell. The handover command may include the duration of the first timer and the duration of the second timer.

In 704, the target base station sends a handover command to the source base station through a handover request acknowledgement message.

In 705, the source base station sends to the terminal device the handover command of the target base station and a condition set by the source base station for the terminal device to initiate handover to the target base station, through an RRC reconfiguration message. The handover command may include the duration of the first timer and the duration of the second timer.

In 706, the terminal device sends an RRC reconfiguration complete message to the source base station.

In 707, when the first timer has not expired and the condition for initiating handover to the target base station is met, and the second timer has not expired, the terminal device uses a dedicated RACH resource to initiate contention-free random access to the target cell.

In 708, when the first timer has not expired and the condition for initiating handover to the target base station is met, and the second timer has expired, the terminal device uses a common RACH resource to initiate a contention-based random access to the target cell.

For operations 707 and 708, the terminal device may perform only one of the operations.

It should be understood that the above examples are merely illustrative examples for the convenience of understanding the technical solutions of the present disclosure, and are not used to limit the implementation of the embodiments of the present disclosure.

FIG. 8 is a schematic diagram of an illustrative application scenario of the present disclosure. As shown in FIG. 8, a terminal device moves in the direction of the arrow, and there are multiple cells in the direction of movement of the terminal device. The source base station and the target base station in this illustrative application scenario correspond to the aforementioned first network device and second network device, respectively.

In this illustrative application scenario, the source base station 800 may estimate a running track of the terminal device based on the position movement and time of the terminal device. For example, if the terminal device moves at a constant speed along an expressway, the source base station 800 may send a handover request to multiple target cells in the front of the running track of the terminal device. For example, the source base station 800 may send a handover request to the target base stations 801-806, respectively, and the handover request may include duration suggestion information of a first timer for the target cell. The duration suggestion information may include duration of the first timer suggested by the source base station and/or estimated duration required for the terminal device to reach the target cell, so that the target base station sets the duration of the first timer of the target cell based on the duration suggestion information. In this illustrative embodiment, multiple target base stations may configure different duration for the first timer based on the duration suggestion information of the source base station 800. In addition, the target base station may further set a second timer, and the relevant details will not be repeated here.

In this illustrative application scenario, the source base station 800 may also send updated duration suggestion information to respective target base stations according to the moving position of the terminal device, so as to avoid that the second network device reserves handover resources for the terminal device for a too long time. The source base station 800 may periodically or aperiodically send the updated duration suggestion information through a handover request.

FIG. 9 is a schematic diagram of another illustrative application scenario of the present disclosure. The source base station and the target base station in this illustrative application scenario respectively correspond to the aforementioned first network device and second network device.

In this illustrative application scenario, a terminal device moves back and forth within a certain range. The source base station 900 may send a handover request to multiple target cells (for example, target base stations 901-906) around the terminal device, and the handover request may include duration suggestion information of a first timer for the target cell. The duration suggestion information may include duration of the first timer suggested by the source base station and/or estimated duration required for the terminal device to reach the target cell, so that the target base station sets the duration of the first timer of the target cell based on the duration suggestion information. In this illustrative embodiment, the multiple target base stations may configure the same duration of first timer based on the duration suggestion information of the source base station 900. In addition, the target base station may further set a second timer, and the relevant details will not be repeated here.

In this illustrative application scenario, the source base station 900 may also send updated duration suggestion information to respective target base stations according to the moving position of the terminal device, so as to avoid that the second network device reserves handover resources for the terminal device for a too long time. The source base station 900 may periodically or aperiodically send the above-mentioned updated duration suggestion information through a handover request.

Figure 10:
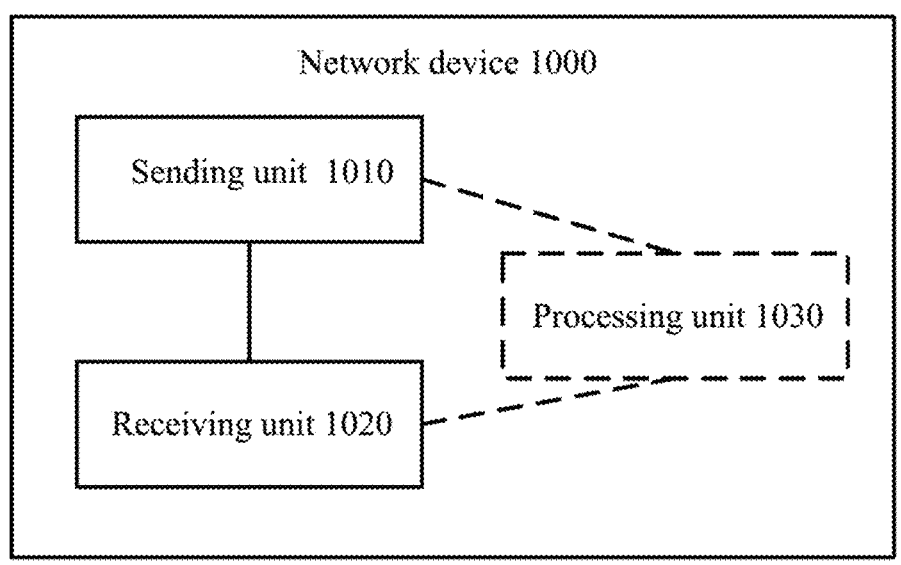
FIG. 10 is a schematic diagram of a logical structure of a network device according to an illustrative embodiment of the present disclosure.

An illustrative embodiment of the present disclosure provides a network device. As shown in FIG. 10, the network device 1000 may include a sending unit 1010 and a receiving unit 1020.

The sending unit 1010 is configured to send a handover request to a second network device, where the handover request includes at least one of the following: conditional handover indication information, and duration suggestion information for a first timer.

The receiving unit 1020 is configured to receive a handover command sent by the second network device, where the handover command includes configuration information used for handover and duration of the first timer, where the first timer is configured to control an effective time of the configuration information in the handover command.

The sending unit 1010 is further configured to send, to a terminal device, the handover command and a condition set by the network device 1000 for the terminal device to initiate handover to the second network device.

In an illustrative embodiment, the conditional handover indication information is configured to indicate that the handover request is for conditional handover.

In an illustrative embodiment, the duration suggestion information for the first timer includes at least one of the following: suggested duration of the first timer and estimated duration required for the terminal device to reach a cell of the second network device.

In an illustrative embodiment, the network device 1000 further includes: a processing unit 1030 configured to determine the duration suggestion information for the first timer according to at least one of the following: moving speed of the terminal device, moving direction of the terminal device, and signal quality of a serving cell currently reported by the terminal device.

In an illustrative embodiment, the sending unit 1010 is further configured to send updated duration suggestion information for the first timer to the second network device.

In an illustrative embodiment, the handover command further includes: duration of a second timer configured for part of resources to be used to access a cell of the second network device.

In an illustrative embodiment, the part of resources to be used to access the cell of the second network device include: a dedicated random access channel RACH resource.

In an illustrative embodiment, the dedicated RACH resource includes a dedicated preamble.

In an illustrative embodiment, the sending unit 1010 is configured to: send the handover request to at least one second network device in the moving direction of the terminal device; or send the handover request to at least one second network device around the network device.

It should be understood that the foregoing embodiment of the network device 1000 may correspond to the method embodiments related to the first network device in the present disclosure, and the above-mentioned and other operations and/or functions of each unit in the network device 1000 may respectively be the corresponding procedures of the method embodiments and examples related to the first network device. For brevity, relevant details are not repeated here.

Figure 11:
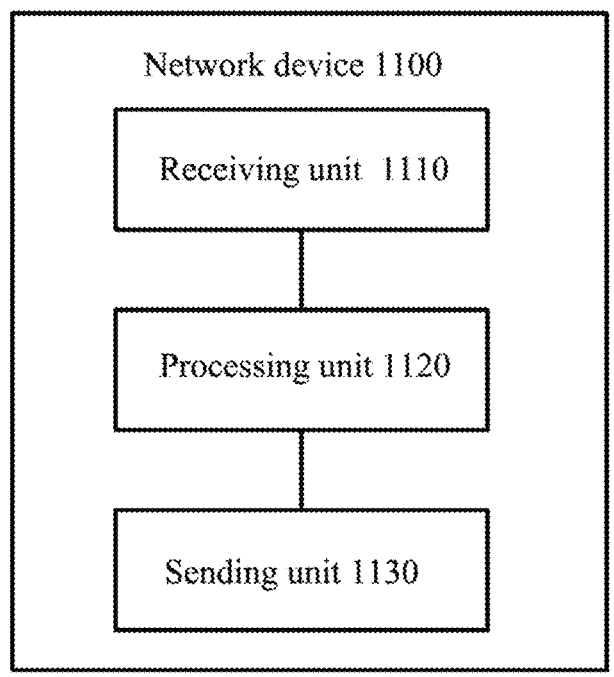
FIG. 11 is a schematic diagram of a logical structure of a network device according to another illustrative embodiment of the present disclosure.

An illustrative embodiment of the present disclosure provides a network device. As shown in FIG. 11, the network device 1100 may include a receiving unit 1110, a processing unit 1120, and a sending unit 1130.

The receiving unit 1110 is configured to receive a handover request sent by a first network device, where the handover request includes at least one of the following: conditional handover indication information, and duration suggestion information for a first timer;

The processing unit 1120 is configured to configure duration of the first timer according to at least one of the conditional handover indication information and the duration suggestion information for the first timer;

The sending unit 1120 is configured to send a handover command to the first network device, where the handover command includes configuration information used for handover and the duration of the first timer, and the first timer is configured to control an effective time of the configuration information in the handover command.

In an illustrative embodiment, the conditional handover indication information is configured to indicate that the handover request is for conditional handover.

In an illustrative embodiment, the suggested duration information for the first timer includes at least one of the following: suggested duration of the first timer and estimated duration required for the terminal device to reach a cell of the network device.

In an illustrative embodiment, the processing unit 1120 is configured to:

when the handover request includes the conditional handover indication information, determine according to the conditional handover indication information that the handover request is for conditional handover, and configure the duration of the first timer for conditional handover;

when the handover request includes the duration suggestion information for the first timer, configure the duration of the first timer according to the duration suggestion information for the first timer;

when the handover request includes the conditional handover indication information and the duration suggestion information for the first timer, determine according to the conditional handover indication information that the handover request is for conditional handover, and configure the duration of the first timer according to the duration suggestion information for the first timer.

In an illustrative embodiment, the receiving unit 1110 is further configured to: receive updated duration suggestion information for the first timer sent by the first network device.

In an illustrative embodiment, the processing unit 1120 is further configured to configure a second timer for part of resources to be used to access a cell of the network device. The handover command sent by the sending unit 1130 to the first network device further includes duration of the second timer.

In an illustrative embodiment, the part of resources to be used to access the cell of the network device include: a dedicated random access channel RACH resource.

In an illustrative embodiment, the dedicated RACH resource includes a dedicated preamble.

It should be understood that the foregoing embodiment of the network device 1100 may correspond to the method embodiments related to the second network device in the present disclosure, and the above-mentioned and other operations and/or functions of each unit in the network device 1100 may be the corresponding procedures of the method embodiments and examples related to the second network device. For brevity, the relevant details are not repeated here.

Figure 12:
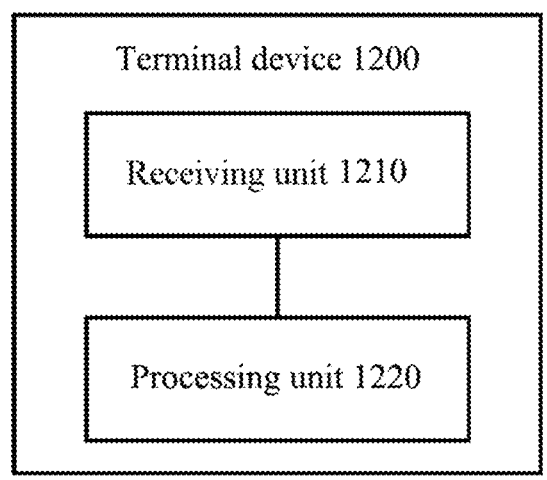
FIG. 12 is a schematic diagram of a logical structure of a terminal device according to an illustrative embodiment of the present disclosure.

An illustrative embodiment of the present disclosure provides a terminal device. As shown in FIG. 12, the terminal device 1200 may include a receiving unit 1210 and a processing unit 1220.

The receiving unit 1210 is configured to receive a handover command and a condition set by a first network device for the terminal device 1200 to initiate handover to a second network device that are sent by the first network device, where the handover command includes configuration information used for handover and duration of a first timer, and the first timer is configured to control an effective time of the configuration information in the handover command;

The processing unit 1220 is configured to start the first timer when the handover command is received, and when the first timer has not expired and the condition for the terminal device to initiate handover to a second network device is met, initiate a procedure of accessing a cell of the second network device.

In an illustrative embodiment, the handover command further includes: duration of a second timer configured for part of resources to be used to access a cell of the second network device. The processing unit 1220 is further configured to start the second timer when the receiving unit 1210 receives the handover command.

In an illustrative embodiment, the part of resources to be used to access the cell of the second network device include: a dedicated random access channel RACH resource.

In an illustrative embodiment, the dedicated RACH resource includes a dedicated preamble.

In an illustrative embodiment, the processing unit 1220 is configured to:

when the first timer has not expired and the condition for the terminal device to initiate handover to a second network device is met, and the second timer has not expired, use a dedicated RACH resource to initiate random access to the cell of the second network device;

when the first timer has not expired and the condition for the terminal device to initiate handover to a second network device is met, and the second timer has expired, use a common RACH resource to initiate random access to the cell of the second network device.

In an illustrative embodiment, the processing unit 1220 is further configured to: when the first timer has not expired, the terminal device 1200 re-attempts to access the cell of the second network device, and the second timer has expired, use a common RACH resource to initiate random access to the cell.

In an illustrative embodiment, the processing unit 1220 is further configured to: when the first timer has not expired and there are multiple cells of the second network device that meet the condition for initiating handover, select to initiate an access procedure to a cell of the second network device of which the second timer has not expired.

The processing unit 1220 is further configured to: when the first timer has not expired, and there are multiple cells of the second network device that meet the conditions for initiating handover, and the second timer of a cell of the second network device has expired when the terminal device 1200 re-attempts to access the cell of the second network device, select to initiate an access procedure to another cell of the second network device of which the second timer has not expired.

It should be understood that the foregoing embodiment of the terminal device 1200 may correspond to the method embodiment related to the terminal device in the present disclosure, and the above-mentioned and other operations and/or functions of each unit in the terminal device 1200 may respectively be the corresponding procedures of the method embodiments and examples related to the terminal device. For brevity, the relevant details are not repeated here.

An illustrative embodiment of the present disclosure provides a network device, including a memory, a processor, and a computer program stored in the memory and executable on the processor, and when the processor executes the computer program, the operations performed by the first network device or the second network device in the present disclosure are implemented.

Figure 13:
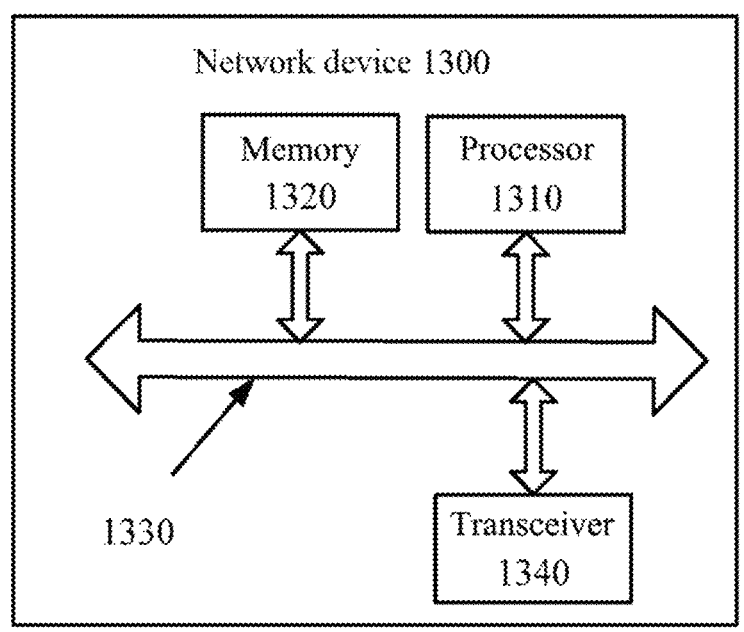
FIG. 13 is a schematic diagram of a hardware structure of a network device according to an illustrative embodiment of the present disclosure.

As shown in FIG. 13, in an example, the network device 1300 may include: a processor 1310, a memory 1320, and a transceiver 1330, where the processor 1310, the memory 1320, and the transceiver 1330 are connected by a bus system, and the memory 1320 is configured to store instructions, and the processor 1310 is configured to execute instructions stored in the memory 1320 to control the transceiver 1330 to send signals. Specifically, the operations of the sending unit and the receiving unit in the aforementioned network device may be executed by the transceiver under the control of the processor, and the operations of the processing unit may be executed by the processor.

It should be understood that the processor 1310 may be a central processing unit (Central Processing Unit, referred to as "CPU"), and the processor 1310 may also be other general-purpose processors, digital signal processors (DSP), application-specific integrated circuits (ASIC), field-programmable gate array (FPGA) or other programmable logic devices, discrete gate or transistor logic devices, discrete hardware components, etc. The general-purpose processor may be a microprocessor or the processor may also be any conventional processor or the like.

The memory 1320 may include a read-only memory and a random access memory, and provides instructions and data to the processor 1310. Part of the memory 1320 may also include a non-volatile random access memory. For example, the memory 1320 may also store device type information.

In addition to a data bus, the bus system 1330 may also include a power bus, a control bus, and a status signal bus. However, for clarity of description, various buses are marked as the bus system 1330 in FIG. 13.

In the implementation process, the processing performed by the network device may be completed by an integrated logic circuit of hardware in the processor 1330 or instructions in the form of software. That is, the operations of the method disclosed in the embodiments of the present disclosure may be embodied as being executed by a hardware processor, or executed by a combination of hardware and software modules in the processor. The software modules can be located in storage media such as a random access memory, a flash memory, a read-only memory, a programmable read-only memory, or an electrically erasable programmable memory, registers. The storage medium is located in the memory 1320, and the processor 1310 reads information in the memory 1320, and completes the foregoing operations in combination with its hardware. To avoid repetition, it will not be described in detail here.

In an illustrative embodiment of the present disclosure, a terminal is also provided. The terminal may include a processor, a memory, and a computer program stored on the memory and executable on the processor, and when the processor executes the computer program, the operations performed by the terminal device in the present disclosure are implemented.

Figure 14:
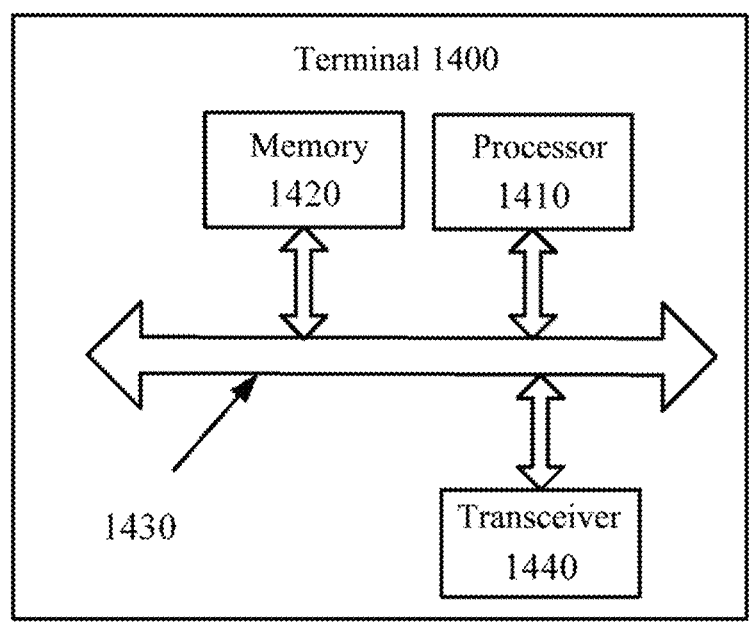
FIG. 14 is a schematic diagram of a hardware structure of a terminal device according to an illustrative embodiment of the present disclosure.

As shown in FIG. 14, in an example, the terminal 1400 may include: a processor 1410, a memory 1420, a bus system 1430, and a transceiver 1440, where the processor 1410, the memory 1420, and the transceiver 1440 are connected through the bus system 1430, the memory 1420 is configured to store instructions, and the processor 1410 is configured to execute the instructions stored in the memory 1420 to control the transceiver 1440 to send signals. Specifically, the operations of the receiving unit in the aforementioned terminal device may be executed by the transceiver under the control of the processor, and the operations of the processing unit may be executed by the processor.

It should be understood that the processor 1410 may be a central processing unit (Central Processing Unit, referred to as "CPU"), and the processor 1410 may also be other general-purpose processors, digital signal processors (DSP), application-specific integrated circuits (ASIC), field-programmable gate array (FPGA) or other programmable logic devices, discrete gate or transistor logic devices, discrete hardware components, etc. The general-purpose processor may be a microprocessor or the processor, and may also be any conventional processor or the like.

The memory 1420 may include a read-only memory and a random access memory, and provides instructions and data to the processor 1410. Part of the memory 1420 may also include a non-volatile random access memory. For example, the memory 1420 may also store device type information.

In addition to a data bus, the bus system 1430 may also include a power bus, a control bus, and a status signal bus. However, for clarity of description, various buses are marked as the bus system 1430 in FIG. 14.

In the implementation process, the processing performed by the terminal device may be completed by an integrated logic circuit of hardware in the processor 1410 or instructions in the form of software. That is, the steps of the method disclosed in the embodiments of the present disclosure may be embodied as being executed and completed by a hardware processor, or executed and completed by a combination of hardware and software modules in the processor. The software modules can be located in storage media, such as a random access memory, a flash memory, a read only memory, a programmable read only memory or an electrically erasable programmable memory, register. The storage medium is located in the memory 1420, and the processor 1410 reads information in the memory 1420, and completes the steps of the foregoing method in combination with its hardware. To avoid repetition, it will not be described in detail here.

An illustrative embodiment of the present disclosure further provides a computer-readable storage medium on which a computer program is stored, and when the computer program is executed by a processor, the processing of any method described in the foregoing embodiments of the present disclosure is implemented.

It will be understood by those of ordinary skill in the art that all or some of the steps, systems, and functional modules/units in the methods disclosed above may be implemented as software, firmware, hardware, and appropriate combinations thereof. In hardware implementations, the division between functional modules/units mentioned in the above description does not necessarily correspond to the division of physical components; For example, one physical component may have multiple functions, or one function or step may be executed by several physical components in cooperation. Some physical components or all physical components can be implemented as software executed by a processor, such as a central processing unit, a digital signal processor, or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those of ordinary skill in the art, the term computer storage medium includes volatile and non-volatile, removable and non-removable media implemented in any method or technique for storing information (such as computer-readable instructions, data structures, program modules or other data). Computer storage media include but are not limited to RAM, ROM, EEPROM, flash memory or other storage technologies, CD-ROM, digital versatile disk (DVD) or other optical disk storage, magnetic cassettes, tapes, magnetic disk storage or other magnetic storage devices, or any other medium that can be used to store desired information and that can be accessed by a computer. In addition, as is well known to those of ordinary skill in the art, communication media usually contain computer-readable instructions, data structures, program modules, or other data in a modulated data signal such as carriers or other transmission mechanisms, and may include any information delivery media.

The present disclosure describes a number of embodiments, but the description is illustrative rather than restrictive, and it is obvious to a person of ordinary skill in the art that there may be more embodiments and implementation solutions within the scope of the embodiments described in the present disclosure. Although many possible combinations of features are shown in the drawings and discussed in the specific embodiments, many other combinations of the disclosed features are also possible. Unless specifically limited, any feature or element of any embodiment can be used in combination with any other feature or element in any other embodiment, or can replace any other feature or element in any other embodiment.

The present disclosure includes and contemplates combinations with features and elements known to those of ordinary skill in the art. The embodiments, features, and elements disclosed in the present disclosure can also be combined with any conventional features or elements to form a unique invention solution defined by the claims. Any feature or element of any embodiment can also be combined with features or elements from other invention solutions to form another unique invention solution defined by the claims. Therefore, it should be understood that any feature shown and/or discussed in this disclosure can be implemented individually or in any suitable combination. Therefore, the embodiments are not restricted except for the restrictions made according to the appended claims and their equivalents. In addition, various modifications and changes can be made within the protection scope of the appended claims.

In addition, when describing representative embodiments, the specification may have presented the method and/or process as a specific sequence of steps. However, to the extent that the method or process does not depend on the specific order of the steps described herein, the method or process should not be limited to the steps in the specific order described. As those of ordinary skill in the art will understand, other sequence of steps is also possible. Therefore, the specific order of steps set forth in the specification should not be construed as a limitation on the claims. In addition, the claims for the method and/or process should not be limited to performing their steps in the written order. Those skilled in the art can easily understand that these sequences can be changed and still remain within the spirit and scope of the embodiments of the present disclosure.

The above are only specific implementations of the present disclosure, but the scope of protection of the present disclosure is not limited there. Any person skilled in the art can easily think of various equivalent modifications or substitutions within the technical scope disclosed in the present disclosure. The protection scope of the present disclosure is subject to the scope defined by the claims.

What is claimed is:

1. A cell handover method, comprising:
   sending, by a first network device, a handover request to a second network device, wherein the handover request comprises at least one of the following: conditional handover indication information or duration suggestion information for a first timer;
   receiving, by the first network device, a handover command sent by the second network device, wherein the handover command comprises configuration information used for handover and duration of the first timer;
   sending, by the first network device, to a terminal device, the handover command and a condition set by the first network device for the terminal device to initiate handover to the second network device;
   wherein the conditional handover indication information is configured to indicate that the handover request is for conditional handover;
   wherein the duration suggestion information for the first timer comprises at least one of the following: suggested duration of the first timer, or estimated duration required for the terminal device to reach a cell of the second network device.

2. The method according to claim 1, wherein the method further comprises: determining, by the first network device, the duration suggestion information for the first timer according to at least one of the following: moving speed of the terminal device, moving direction of the terminal device, and signal quality of a serving cell currently reported by the terminal device.

3. The method according to claim 1, wherein the method further comprises: sending, by the first network device, updated duration suggestion information for the first timer to the second network device.

4. The method according to claim 1, wherein the handover command further comprises: duration of a second timer configured for part of resources to be used to access a cell of the second network device.

5. The method according to claim 1, wherein the sending, by a first network device, a handover request to a second network device comprises:
   sending, by the first network device, the handover request to at least one second network device in moving direction of the terminal device; or
   sending, by the first network device, the handover request to at least one second network device around the first network device.

6. A cell handover method, comprising:
   receiving, by a terminal device, a handover command and a condition set by a first network device for the terminal device to initiate handover to a second network device that are sent by the first network device, wherein the handover command comprises configuration information used for handover and duration of a first timer;

starting, by the terminal device, the first timer upon determining that the handover command is received;

upon determining that the first timer does not expire and the condition for initiating handover to the second network device is met, initiating, by the terminal device, a procedure of accessing a cell of the second network device.

7. The method according to claim 6, wherein the handover command further comprises: duration of a second timer configured for part of resources to be used to access the cell of the second network device;

the method further comprises: starting, by the terminal device, the second timer upon determining that the handover command is received.

8. The method according to claim 6, wherein upon determining that the first timer has not expired and the condition for initiating handover to the second network device is met, initiating, by the terminal device, a procedure of accessing the cell of the second network device, comprises:

upon determining that the first timer has not expired and the condition for initiating handover to the second network device is met, and the second timer has not expired, using, by the terminal device, the dedicated random access channel (RACH) resource to initiate random access to the cell of the second network device;

upon determining that the first timer has not expired and the condition for initiating a handover to the second network device is met, and the second timer has expired, using, by the terminal device, a common RACH resource to initiate random access to the cell of the second network device.

9. The method according to claim 6, wherein the method further comprises: upon determining that the first timer has not expired, the terminal device re-attempts to access the cell of the second network device, and the second timer has expired, using, by the terminal device, a common RACH resource to initiate random access to the cell.

10. The method according to claim 6, wherein the method further comprises:

upon determining that the first timer has not expired and there are multiple cells of the second network device that meet the conditions for initiating handover, selecting, by the terminal device, to initiate an access procedure to a cell of the second network device of which the second timer has not expired.

11. A network device, comprising: a processor, a memory and a transceiver, the memory is configured to store instructions, and the processor is configured to execute instructions stored in the memory to control the transceiver to:

send a handover request to a second network device, wherein the handover request comprises at least one of the following: conditional handover indication information or duration suggestion information for a first timer;

receive a handover command sent by the second network device, wherein the handover command comprises configuration information used for handover and duration of the first timer;

wherein the transceiver is further configured to send, to a terminal device, the handover command and a condition set by the network device for the terminal device to initiate handover to the second network device;

wherein the conditional handover indication information is configured to indicate that the handover request is for conditional handover;

wherein the duration suggestion information for the first timer comprises at least one of the following: suggested duration of the first timer, or estimated duration required for the terminal device to reach a cell of the second network device.

12. The network device according to claim 11, wherein the part of resources to be used to access the cell of the second network device comprises: a dedicated random access channel (RACH) resource;

the dedicated RACH resource comprises a dedicated preamble.

13. A terminal device, comprising: a processor, a memory and a transceiver, the memory is configured to store instructions, and the processor is configured to execute instructions stored in the memory;

the processor is configured to control the transceiver to receive a handover command and a condition set by a first network device for the terminal device to initiate handover to a second network device that are sent by the first network device, wherein the handover command comprises configuration information used for handover and duration of a first timer;

the processor is configured to: start the first timer upon determining that the handover command is received, and upon determining that the first timer does not expire and the condition for initiating handover to the second network device is met, initiate a procedure of accessing a cell of the second network device.

14. The terminal device according to claim 13, wherein the handover command further comprises: duration of a second timer configured for part of resources to be used to access the cell of the second network device;

the processor is further configured to start the second timer upon determining that the transceiver receives the handover command.

15. The terminal device according to claim 13, wherein the part of the resources to be used to access the cell of the second network device comprises: a dedicated random access channel RACH resource;

the dedicated RACH resource comprises a dedicated preamble.

16. The terminal device according to claim 13, wherein the processor is further configured to: upon determining that the first timer has not expired and there are multiple cells of the second network device that meet the conditions for initiating handover, select to initiate an access procedure to a cell of the second network device of which the second timer has not expired.

17. The terminal device according to claim 13, wherein the processor is further configured to: upon determining that the first timer has not expired and there are multiple cells of the second network device that meet the conditions for initiating handover, and the second timer of a cell of the second network device has expired upon determining that the terminal device re-attempts to access the cell of the second network device, select to initiate an access procedure to another cell of the second network device of which second timer has not expired.

* * * * *